Nov. 14, 1939.  A. LAGRANGE  2,180,061

CAKE MAKING DEVICE

Filed Sept. 9, 1939   6 Sheets—Sheet 1

Inventor

Alfred Lagrange

By Clarence A. O'Brien
and Hyman Berman
Attorneys

Nov. 14, 1939.   A. LAGRANGE   2,180,061
CAKE MAKING DEVICE
Filed Sept. 9, 1939    6 Sheets—Sheet 3

Inventor
Alfred Lagrange
By Clarence A. O'Brien
and Hyman Berman
Attorneys

Nov. 14, 1939.  A. LAGRANGE  2,180,061
CAKE MAKING DEVICE
Filed Sept. 9, 1939  6 Sheets-Sheet 5

Inventor

Alfred Lagrange

By Clarence A. O'Brien
and Hyman Berman
Attorneys

Patented Nov. 14, 1939

2,180,061

UNITED STATES PATENT OFFICE 2,180,061

CAKE MAKING DEVICE

Alfred Lagrange, Woodside, Long Island, N. Y.

Application September 9, 1939, Serial No. 294,189

12 Claims. (Cl. 107—66)

This invention relates to a device for making cakes, such as the type known as "pancake" and other types of cakes, such for instance as "Crepes Suzette", waffles, etc.

The general object of the invention is to provide a machine that is wholly automatic in operation from the dipping of a hot plate in batter to the finished product, the only manual operation required being that of removing the finished product from the machine.

Another object of the invention is to so construct and arrange the parts that cakes of uniform shape and thickness and appearance are produced by the machine and the finished product has an attractive appearance and the machine has adjustable features so that it can produce cakes of different thicknesses and the time of cooking or baking can be regulated as desired.

This invention also consists in certain other features of construction and in the combination and arrangement of the several parts to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:

Figure 7 is a top plan view of the lower plates or units.

In these views the letter A indicates a boxlike base which is formed on the front part of its top with the bearing means 1 for the shaft 2 to which is attached the plate-like attaching members 3 for the lower baking units 4 which include the two hot plates 5 and the supporting means 6.

Posts 7 are connected with the rear portion of the top of the base and a shaft 8 is rotatably supported in these posts and as will be seen these posts are much higher than the bearing members 1 so that the shaft 8 is in a much higher plane than is shaft 2. Plate-like connecting members 9 are connected with the shaft 8 and are connected with the supporting plates 10 for the upper hot plates or units 11.

While the drawings show a pair of upper and lower units or hot plates it is to be understood that any number of these units can be used as the device can be constructed to bake a single cake, pair of cakes, or any desired number of cakes.

Figure 13:
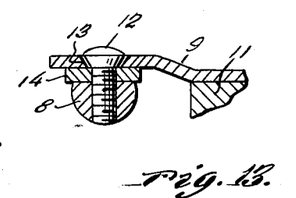
Figure 13 is a section on the line 13—13 of Figure 2.
Figure 14:
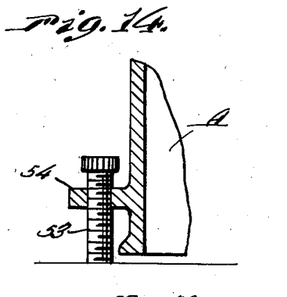
Figure 14 is a section on the line 14—14 of Figure 1.

As shown more particularly in Figure 13, the plates 9 are connected with the shaft 8 by screws 12 which have their heads fitting loosely in holes 13 in said plates 9 with the shanks passing through washers 14 and then into the shaft 8. This means of connecting the plates 9 with the shaft 8 permits a certain degree of movement of the upper units 11 relative to the shaft 8 so that they can adjust themselves as they near their downward limit of movement to drop upon the lower units 5 in such a manner as to not distort the cake forming batter on the lower units.

Figure 4:
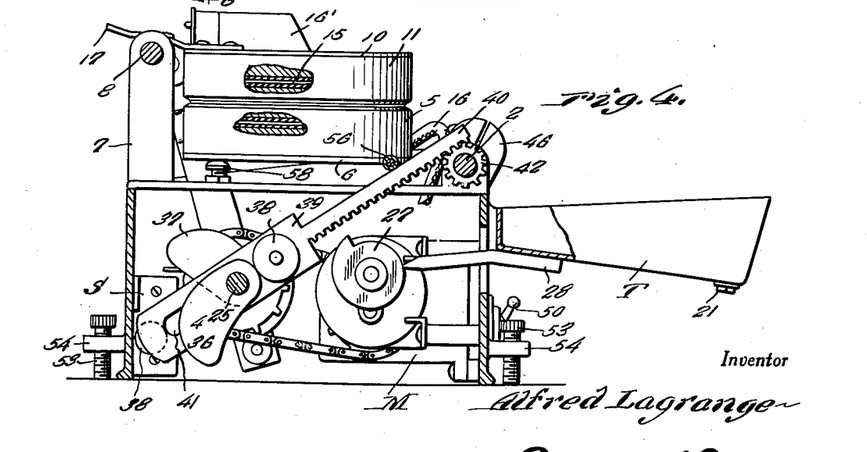
Figure 4 is a view similar to Figure 3 but showing the baking plates or units in operative position.

As shown in Figure 4 each of the hot plates or baking units is provided with electric heating means shown generally at 15 and these heating units 15 of the lower members are connected to conductors 16 which are adapted to be connected to a source of electricity and the heating units 15 of the upper members are connected with the socket means 16' so that these upper members can be connected by conductors to the source of current. Suitable means are provided for controlling the passage of current through the members 15 in the usual or any desired manner.

Figure 3:
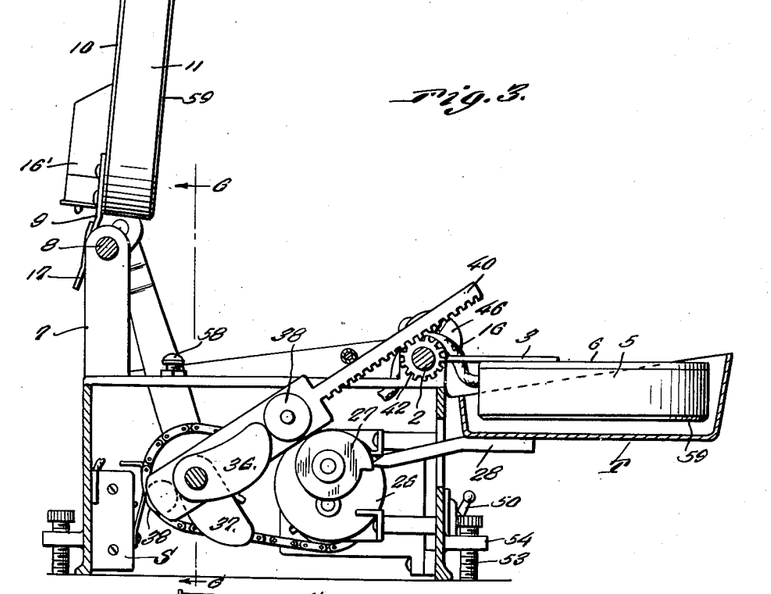
Figure 3 is a section on the line 3—3 of Figure 1 but with the lower plates or units in the batter tray.

A stop member 17 is connected with one of the plates 9 and is adapted to engage a part of the shaft 8 for limiting upward movement of the upper members, shown in Figure 3, and a spring 18 encircles a part of the shaft 8 and has one end connected to a collar 19 on the shaft and adjustable thereon and the other end of the spring is connected to a post 7, said spring tending to hold the upper members 11 in raised position. A batter receiving tray T is formed with the upstanding hook members 20 at its inner side and at the ends thereof and these hook members engage portions of the shaft 2 for holding the tray extending forwardly from the front of the base and in position to receive the lower baking members 5 when the same have been swung upwardly and outwardly, as shown in Figure 3. This tray gradually increases in depth from its inner side to its outer side with its bottom held normally in a downwardly and forwardly sloping position and said tray is formed with a drain opening closed by a plug 21 as shown in Figure 4.

A motor M, provided with reducing gears, is located in the hollow base or casing A and has a sprocket wheel 22 thereon over which passes a chain 23 which also passes over a sprocket wheel 24 on a shaft 25 journaled in the hollow base. The shaft of the motor is connected with reducing gears located in a housing 26 and these gears drive a cam disk 27 for engaging the pointed end of a bar 28 fastened to the bottom of the tray adjacent its inner side so that this cam and bar 28 gradually raises the tray during the operation of the machine so as to maintain the level of batter in the tray at a certain point, as the batter is being removed during the operation of the machine.

A cam or eccentric 30 is fastened to the shaft 25 and engages a roller 31 carried by the lower end of a bar 32 which passes through a slot 33 in the top of the base and has its upper end pivoted to a crank 34 on one end of the shaft 8, said bar 32 having an elongated longitudinally extending slot 35 therein through which a part of the shaft 25 passes which acts as a fulcrum and guide for the bar, these parts being so arranged that during the rotation of the shaft 25 the cam 30 engaging the roller 31 will cause the bar 32 to rotate the shaft 8 and thus lower the members 11 against the action of the spring 18.

Two cams 36 and 37 are attached to the opposite end portion of the shaft 25 for engaging upper and lower rollers 38 on the slotted base part 39 of a rack bar 40, the slot 41 of which receives a portion of the shaft 25 so that as the shaft 25 rotates the engagement of the cams 36 and 37 with the rollers 38 will reciprocate the rack bar and the teeth of the bar engage a pinion 42 on the shaft 2 for rotating the said shaft to actuate the lower hot plates 5.

A crank arm 43 is connected to one end of the shaft 2 and a coiled spring 44 has one end connected to this arm and its other to a projection 45 extending from an end of the base and the other end of the shaft 2 is engaged by a brake member 46 of any suitable construction, the brake member checking the movement of the shaft 2.

Figure 16:
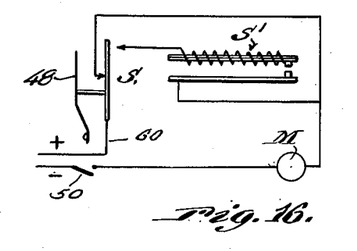
Figure 16 is a diagrammatic view of the circuits.

A switch arm 47 is carried by the shaft 25 for engaging a spring switch member 48 of a switch shown generally at S controlling the circuit of the motor. A thermal switch S' is also located in the circuit as shown in Figure 16 and a main switch 50 is connected with an exterior part of the base for opening and closing the motor circuit manually.

Figure 15:
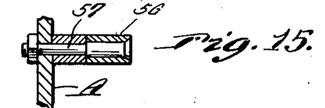
Figure 15 is a section on the line 15—15 of Figure 2.

A small fan 51 is attached to a part of the motor shaft and is arranged to draw air into the base or casing A through the openings 52 in one end thereof and arranged adjacent the fan. Also leveling screws 53 pass through threaded holes in lugs 54 extending from the sides of the base A adjacent the lower end, these screws engaging a surface on which the device is placed so that it can be leveled if the surface is not perfectly flat. Handles 55 are connected with the ends of the base A. A small roll 56 engages the upper edge of the rack bar 40 and is rotatably supported by a pin 57 passing through an end part of the base A as shown more particularly in Figure 15. A screw 58 passes through a threaded hole in the top of the base and provides means for limiting the downward movement of the lower baking unit and for holding this lower unit in a perfectly level and horizontal position but in the position over the top of the base as shown in Figure 4 and each hot plate or baking unit is beveled as shown at 59 at the periphery of that face which contacts the cake. This beveling provides a neat and thin edge for the cake and facilitates removal of the cake either by hand or by an implement such as a fork or the like. The conductors for the motor are shown at 60.

The batter from which the cakes are made is placed in the tray and at the beginning of the baking operation the cam 27 should be in a position with its smallest part engaging the pointed end of the rod 28 so that the tray will be in lowest position.

Figure 5:
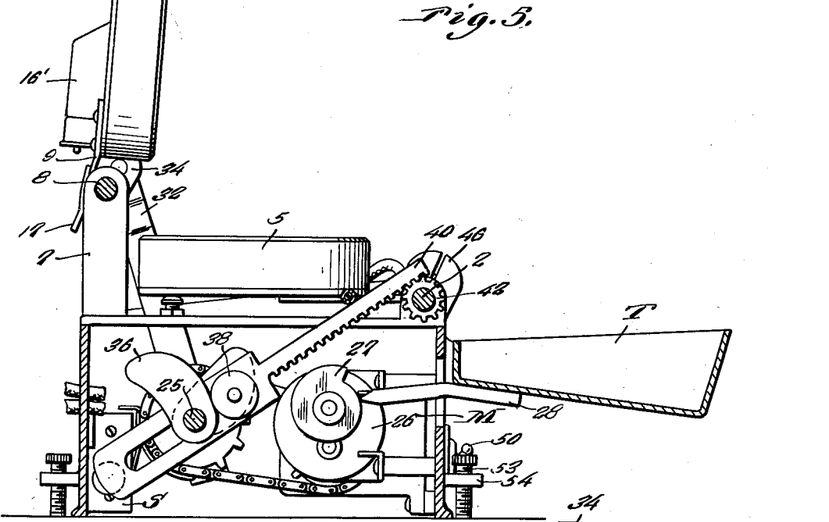
Figure 5 is a view similar to Figure 3 but showing the parts in the position they occupy in Figure 1.
Figure 6:
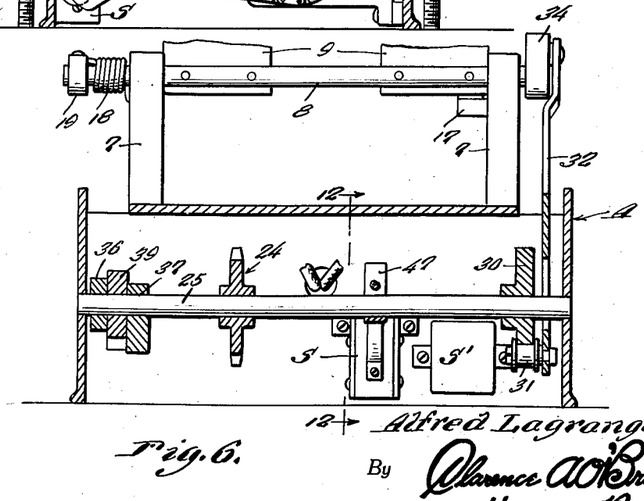
Figure 6 is a section on the line 6—6 of Figure 3.
Figure 8:
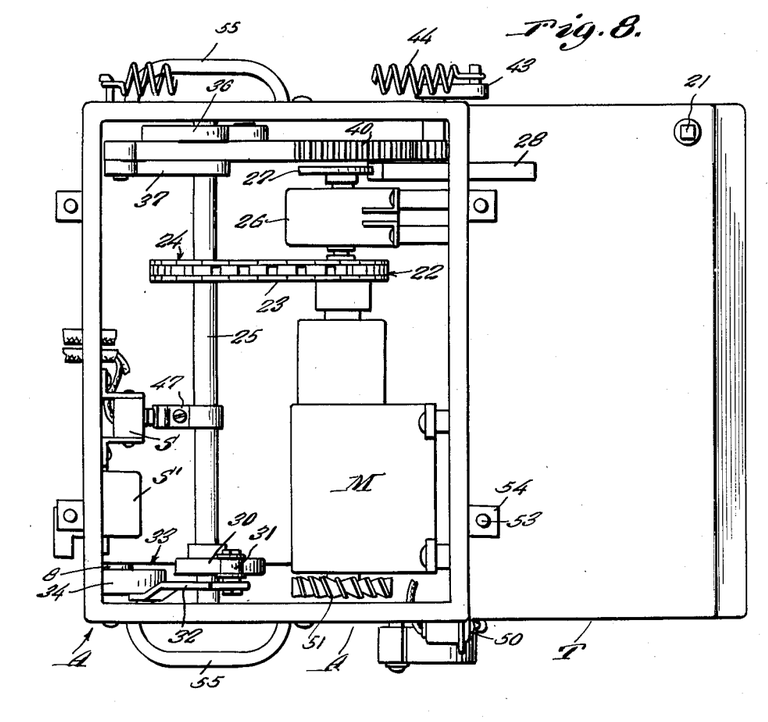
Figure 8 is a bottom plan view of the device.
Figure 9:
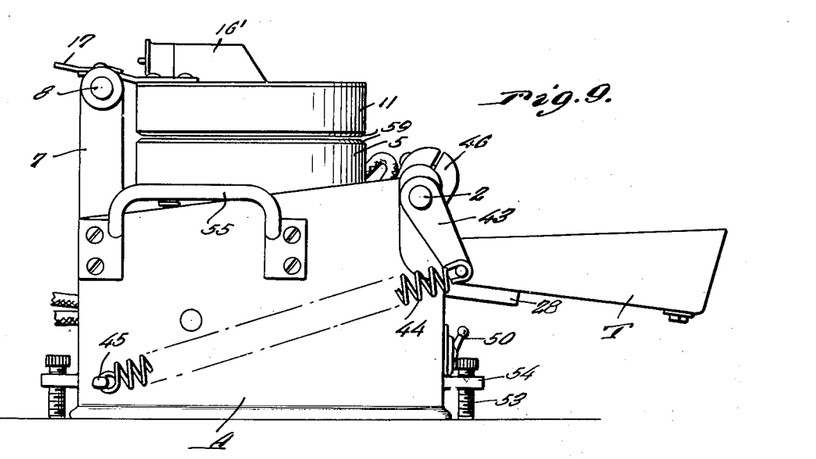
Figure 9 is an end view of the device with the parts in baking position.
Figure 10:
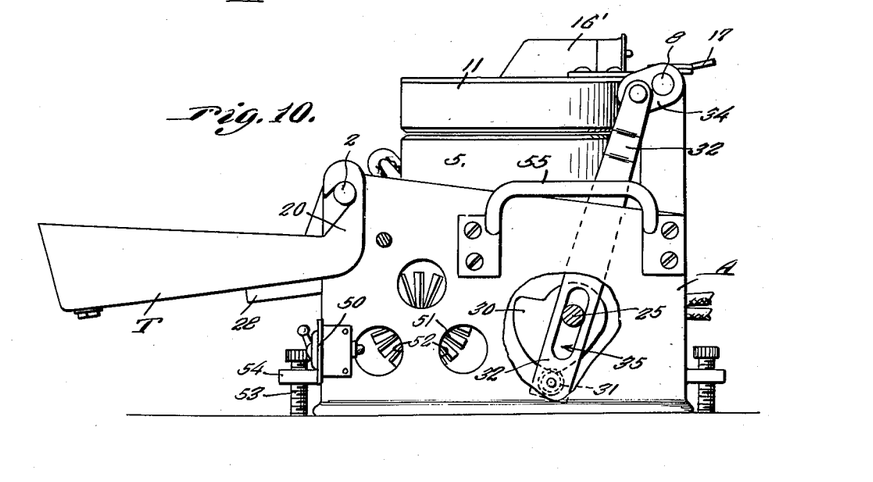
Figure 10 is a view of the opposite end of the device.
Figure 11:
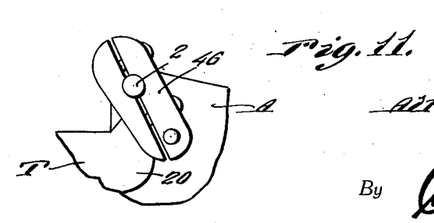
Figure 11 is a fragmentary end view showing the brake.
Figure 12:
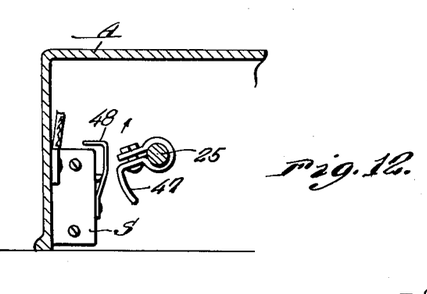
Figure 12 is a section on the line 12—12 of Figure 6.

Starting with the parts in the position shown in Figure 5 the switch S is in a position connecting the thermal device S' in the motor circuit so that when the switch 50 is closed the current will pass into the heating part s of the member S' and thus the current will not flow to the motor until the thermal switch has been heated to a degree which will cause it to close and then the motor will start to operate the parts and just as soon as the shaft 25 starts to rotate the switch arm 47 will move off the spring member 48 so that the switch S will connect the motor directly in the circuit and the thermal device S' will be cut out of the circuit and the motor will continue to operate until the shaft 25 has made one revolution which will bring the arm 47 again into contact with the member 48 which breaks the main circuit of the motor and connects the thermal device S' in the circuit but as this member S' is cold the circuit to the motor will be broken and will remain broken until the thermal device has become heated again to a sufficient degree to close the circuit by this device. Then the parts will start a new cycle of operation.

During the first motion of the movement of the shaft 25 cam 36 engages roller 38 on rack bar 40 and starts to move the rack bar upwardly and forwardly which rotates the shaft 2 by means of the pinion 42 so that the lower hot plates are swung upwardly and forwardly and are finally placed with their baking faces in the batter in the tray, as shown in Figure 3. During the first part of this movement of the lower hot plates the spring 44 helps to raise the plates and during the downward movement into the tray the spring tends to counterbalance the weight of the downwardly moving parts and this spring acts in the same manner as the lower hot plates are swung back to the starting point. Of course, before the switch 50 is closed the switch controlling the flow of current to the heating elements 15 in the two sets of hot plates is closed so that these hot plates are heated to the desired degree before the machine is thrown into operation.

Of course, the dipping of the lower plates 5 into the batter in the tray will cause some of the batter to adhere to the plates and the parts are so formed that the plates 5 enter the batter in the tray with their baking faces in an inclined position and said faces gradually assume a substantially horizontal position, thus preventing any air bubbles from collecting under the faces so that a smooth layer of batter of uniform thickness forms on said faces and the longer the plates remain in the batter the thicker will be the layer so by controlling the movement of these plates cakes of different thicknesses can be formed, such movement being controlled by the shape and positions of the cams 36 and 37.

Then the cam 37 engages the roller 38 to move the rack bar 40 downwardly so as to reverse the movement of the shaft 2 which moves the hot plates 5 upwardly, out of the tray and onto the top of the base to its original position. Of course, during all this movement the batter is being baked or cooked on the plates 5 and during this movement the plates or units 11 remain in raised position until the rotation of the shaft 25 causes the cam 30 to engage the roller 31 at the bar 32 to lower the bar and this movement of the bar turns the crank 34 and shaft 8 which results in downward movement of the plates 11 upon the batter on the members 1 and as before stated the formation of the plates 9 and their connections with the shaft 8 by the screws 12 permit these members 11 to move downwardly, near the ends of their downward stroke, in a substantially vertical position so that their baking faces will engage the cakes on the lower members flatly enough to prevent any disarrangement of the cake material and then the material is baked or cooked by the heat from both of the upper and lower sets of hot plates. After the upper and lower members remain in baking position, as shown in Figure 4, for the time required to properly bake the cakes the cam 30 disengages the roller 31 of the bar 32 so that the spring 18 on shaft 8 can move the upper members 11 to the raised position and the switch S is engaged by the switch arm on shaft 25 to break the circuit of the motor and to close the circuit to the thermal switch S' and this switch S' should be so adjusted as to keep the motor circuit broken until the operator has ample time to remove the cakes from the lower hot plates, before the circuit to the motor is again closed by the closing of the circuit by the thermal switch part S'. Of course, when this is done the cycle of operation starts over again to bake another set of cakes.

The brake member 46 is adjusted to give a smooth and slow movement of the shaft 2 and the parts carried thereby.

The dipping of the lower plates 5 into the batter in the tray while the plates are hot, result in a uniform layer of material adhering to each member 5 so that the resultant cake is of uniform thickness and has a smooth surface and, as before stated, the thickness of the cake can be controlled by the length of time the member 5 is left in the batter. There is no dripping of the material from the plates 5 as they move upwardly out of the batter as the hot plates cause the batter in contact therewith to thicken and adhere to the plates. Also and as before stated, the plates 5 enter the batter at an angle so as to force any air from between the plates and the surface of the batter as the plates enter the batter. Thus there are no air pockets formed under the plates that will produce holes in the cake so that the cake is of uniform size and texture. As before stated the bevel 59 on each of the hot plates provides a neat and thin and uniform edge for each cake and facilitates removal of the cake from the lower member after the upper has been raised. The edge is of the same structure as the rest of the cake and is not brittle or cooked more than other portions of the cake as it would be if these beveled parts were not provided.

Figure 1:
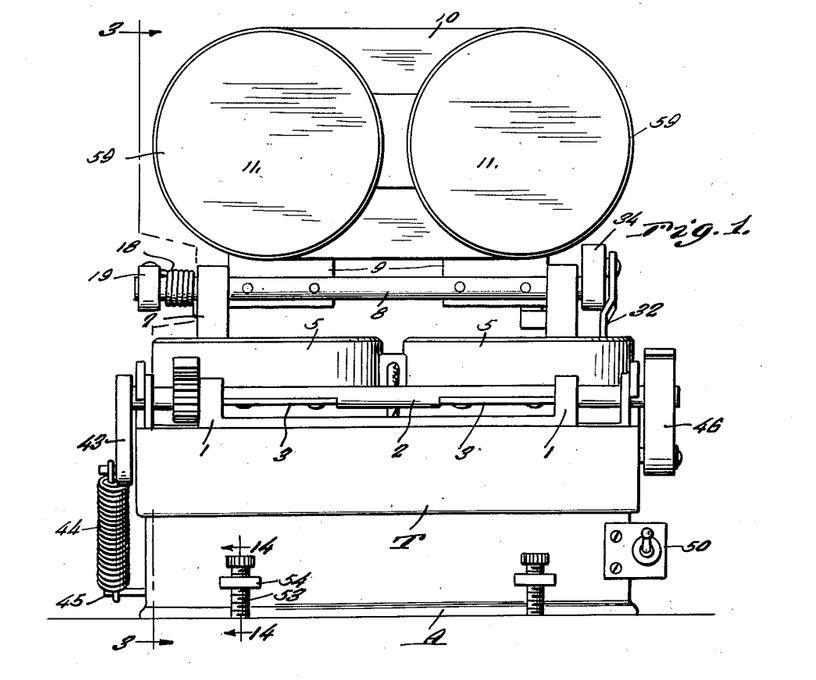
Figure 1 is a front elevational view with the lower baking plates in operative position and the upper plates in raised position.
Figure 2:
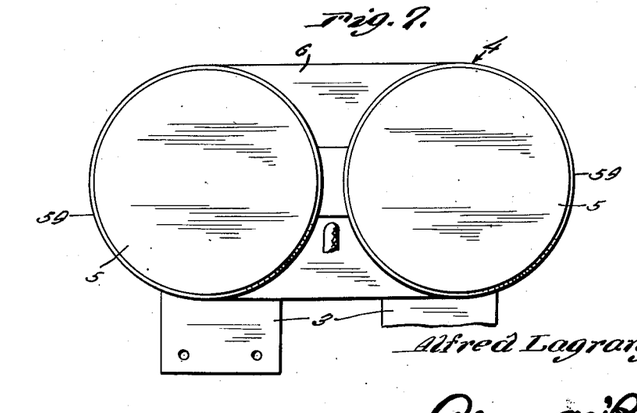
Figure 2 is a top plan view with the parts in baking position.

As will be seen the cake remains on the lower member 5 a much longer time than the top of the cake is engaged by the upper member 11. This provides a uniform color on both sides of the cake and a thorough baking of the cake. Of course, the time the upper and lower members remain in baking position as shown in Figure 2 can be regulated by the cam 30 for the longer the cam stays in contact with the roller 31 the longer the member 11 will remain in lowered position. It will also be understood that the baking process can be regulated by the thermostatic means associated with the heating element 15, in the usual manner. It is preferable to have the upper plates heated to a greater degree than the lower plates so as to make up for the longer time the material remains on the lower plates than the upper plates. The delayed action of the upper plates moving downwardly upon the lower plates, after the material on the lower plates has been cooked to a certain extent makes the resultant product elastic and pliable which it would not be if the two plates engaged the material practically at the same time. Also this delayed action avoids injury to the cake when the two plates come together as this permits escape of some of the steam generated by the batter on the hot plates as this steam would injure the cake if it was confined by the two plates coming together too soon after the batter was placed on the lower plates. The resultant product is of uniform size and texture and is very flexible and not brittle so that it is especially desirable for use in the production of "Crepes Suzettes" where the cakes must be rolled or folded.

The baking surfaces of the hot plates can be made of any suitable form to bake cakes of any desired shape and type. For instance, by making these surfaces like those of waffle irons the device can be used for making waffles and instead of being of circular shape as shown the hot plates can be of square shape or any other suitable shape.

Also sets of plates can be provided for the apparatus so that one set of plates can be removed and another set of a different type substituted therefor. This enables the apparatus to be used for making pancakes and then by removing the hot plates used for making pancakes and substituting hot plates made to form waffles, waffles can be made with the device.

If desired a small hand or other indicator can be attached to the shaft 25 to indicate when the cakes are ready for removal or when the top hot plates are raised.

It is thought from the foregoing description that the advantages and novel features of the invention will be readily apparent.

It is to be understood that changes may be made in the construction and in the combination and arrangement of the several parts provided that such changes fall within the scope of the appended claims.

Having described the invention, what is claimed as new is:

1. A cake making machine of the class described comprising a base, a lower hot plate, an upper hot plate normally held in raised position, a batter tray at one side of the base, means for swinging the lower plate from a position resting on the base, in an arc to place its baking face in the batter and then to return the plate to its first position and means associated with the first-mentioned means for moving the top plate downwardly upon the lower plate and then to return the top plate to its first position.

2. A cake making machine comprising a base, a lower hot plate, a shaft journaled in the base adjacent the front thereof, an arm connecting the lower plate with the shaft, a batter tray located adjacent the front of the base, means for rocking the shaft to first swing the lower plate from a position on the base to a position where it enters the batter in the tray and for then swinging the plate in an opposite direction to return it to its starting point, uprights on the rear part of the base, a shaft journaled in the uprights, a top hot plate, an arm connecting the top plate to the second shaft, means for moving the second shaft to swing the second plate downwardly upon the first plate when the first plate is in its neutral position on top of the base, after which the top plate is returned to raised position.

3. A cake making machine comprising a base made in the form of a casing, a shaft journaled in the top part of the casing at the front thereof, a hot plate, an arm connecting the plate with the shaft, said hot plate normally resting on the top of the base in a horizontal position, a batter tray at the front of the base, a shaft in the casing, a gear on the first-mentioned shaft, a rack bar engaging the gear, cam means for reciprocating the rack bar from the second shaft to cause the first shaft to swing the hot plate in an arc of a circle from a position on top of the base to a position where it enters the batter in the tray, after which it is swung back to its original position, uprights on the rear part of the casing, a shaft journaled in the uprights, an upper hot plate, an arm connecting the same with the last-mentioned shaft, spring means for holding the upper hot plate in raised position, a crank on the last-mentioned shaft, a bar connected with the crank and extending into the casing, cam means on the second shaft and engaging a part on the bar for swinging the top hot plate downwardly upon the first hot plate when said first plate is in position on top of the casing, the cam releasing the bar after the second shaft is rotated a certain distance to permit the spring means to raise the top plate.

4. A cake making machine comprising a base made in the form of a casing, a shaft journaled in the top part of the casing at the front thereof, a hot plate, an arm connecting the plate with the shaft, said hot plate normally resting on top of the base in a horizontal position, a batter tray at the front of the base, a shaft in the casing, a gear on the first-mentioned shaft, a rack bar engaging the gear, cam means for reciprocating the rack bar from the second shaft to cause the first shaft to swing the hot plate in an arc of a circle from a position on top of the base to a position where it enters the batter in the tray, after which it is swung back to its original position, uprights on the rear part of the casing, a shaft journaled in the uprights, an upper hot plate, an arm connecting the same with the last-mentioned shaft, spring means for holding the upper hot plate in raised position, a crank on the last-mentioned shaft, a bar connected with the crank and extending into the casing, cam means on the second shaft and engaging a part on the bar for swinging the top hot plate downwardly upon the first hot plate when said first plate is in position on top of the casing, the cam releasing the bar after the second shaft is rotated a certain distance to permit the spring means to raise the top plate, and means for connecting the arm of the upper hot plate with the shaft for permitting a certain amount of movement between the parts to permit the top plate to engage the bottom plate in a vertical downward movement.

5. A cake making machine comprising a base made in the form of a casing, a shaft journaled in the top part of the casing at the front thereof, a hot plate, an arm connecting the plate with the shaft, said hot plate normally resting on top of the base in a horizontal position, a batter tray at the front of the base, a shaft in the casing, a gear on the first-mentioned shaft, a rack bar engaging the gear, cam means for reciprocating the rack bar from the second shaft to cause the first shaft to swing the hot plate in an arc of a circle from a position on top of the base to a position where it enters the batter in the tray, after which it is swung back to its original position, uprights on the rear part of the casing, a shaft journaled in the uprights, an upper hot plate, an arm connecting the same with the last-mentioned shaft, spring means for holding the upper hot plate in raised position, a crank on the last-mentioned shaft, a bar connected with the crank and extending into the casing, cam means on the second shaft and engaging a part on the bar for swinging the top hot plate downwardly upon the first hot plate when said first plate is in position on top of the casing, the cam releasing the bar after the second shaft is rotated a certain distance to permit the spring means to raise the top plate, a motor in the casing for driving the second shaft and means for temporarily and automatically stopping the motor for a short period of time as the top plate raises to inoperative position.

6. A cake making machine comprising a base made in the form of a casing, a shaft journaled in the top part of the casing at the front thereof, a hot plate, an arm connecting the plate with the shaft, said hot plate normally resting on top of the base in a horizontal position, a batter tray at the front of the base, a shaft in the casing, a gear on the first-mentioned shaft, a rack bar engaging the gear, cam means for reciprocating the rack bar from the second shaft to cause the first shaft to swing the hot plate in an arc of a circle from a position on top of the base to a position where it enters the batter in the tray, after which it is swung back to its original position, uprights on the rear part of the casing, a shaft journaled in the uprights, an upper hot plate, an arm connecting the same with the last-mentioned shaft, spring means for holding the upper hot plate in raised position, a crank on the last-mentioned shaft, a bar connected with the crank and extending into the casing, cam means on the second shaft and engaging a part on the bar for swinging the top hot plate downwardly upon the first hot plate when said first plate is in position on top of the casing, the cam releasing the bar after the second shaft is rotated a certain distance to permit the spring means to raise the top plate, a motor in the casing for driving the second shaft and means for temporarily and automatically stopping the motor for a short period of time as the top plate raises to inoperative position, and means for slowly raising the tray from the motor to keep the level of batter therein substantially constant.

7. In a cake making machine, a base in the form of a casing, a shaft journaled on the top of the casing at the front thereof, a lower hot plate, an arm connecting the plate with the shaft, motor driven means for first moving the shaft to swing the plate from a position on top of the casing to a position in front of the casing and then back to its original position, a batter tray at the front of the casing into which the plate dips near the end of its forward movement, uprights at the rear of the casing, a shaft journaled therein, a top hot plate, an arm movably connecting the top plate with the second shaft, means actuated by the motor for swinging the top plate downwardly upon the lower plate after the lower plate has been moved back to its original position with the batter thereon picked up from the tray, said top plate moving upwardly to its original position after a period of time, each plate having the periphery of its baking face beveled.

8. In a cake making machine, a base forming casing, a lower baking plate, an upper baking plate, means for supporting each plate for swinging movement from the casing, electric heating means in each plate, a batter tray at the front of the casing, means for first swinging the lower plate from a position on top of the casing to a position where its baking surface is immersed in the batter in the tray, after which the plate is returned to its first position, means for normally holding the upper plate in raised position, means for swinging the upper plate downwardly into engagement with the lower plate, after the lower plate has been returned to its normal position, the latter means holding the upper plate in lowered position for a certain period of time after which the upper plate returns to raised position, a motor for actuating the plate operating means and means for temporarily and automatically stopping the motor for a certain period of time after the top plate has been returned to raised position, after which the motor begins to operate to again move the plates.

9. In a cake making machine, a base forming casing, a lower baking plate, an upper baking plate, means for supporting each plate for swinging movement from the casing, electric heating means in each plate, a batter tray at the front of the casing, means for first swinging the lower plate from a position on top of the casing to a position where its baking surface is immersed in the batter in the tray, after which the plate is returned to its first position, means for normally holding the upper plate in raised position, means for swinging the upper plate downwardly into engagement with the lower plate, after the lower plate has been returned to its normal position, the latter means holding the upper plate in lowered position for a certain period of time after which the upper plate returns to raised position, a motor for actuating the plate operating means and means for temporarily and automatically stopping the motor for a certain period of time after the top plate has been returned to raised position, after which the motor begins to operate to again move the plates, means for retarding the movement of the lower plate and spring means for counter-balancing the lower plate during its movement.

10. In a cake making machine, a base forming casing, a lower baking plate, an upper baking plate, means for supporting each plate for swinging movement from the casing, electric heating means in each plate, a batter tray at the front of the casing, means for first swinging the lower plate from a position on top of the casing to a position where its baking surface is immersed in the batter in the tray, after which the plate is returned to its first position, means for normally holding the upper plate in raised position, means for swinging the upper plate downwardly into engagement with the lower plate, after the lower plate has been returned to its normal position, the latter means holding the upper plate in lowered position for a certain period of time after which the upper plate returns to raised position, a motor for actuating the plate operating means and means for temporarily and automatically stopping the motor for a certain period of time after the top plate has been returned to raised position, after which the motor begins to operate to again move the plates, the means for moving the lower plate including means for causing the plate to enter the batter at an incline.

11. A cake making machine comprising a base forming casing, a shaft rotatably supported by the casing at the front thereof, an arm connected with the shaft, an electrically heated plate carried by the arm, a batter tray supported at the center of the casing, a gear on the shaft, a driven shaft journaled in the casing, a rack bar having its teeth engaging the gear, rollers on the bar, cams on the driven shaft for reciprocating the rack bar to rock the plate carrying shaft to move the plate first from a position on top of the casing to a position where its baking surface will enter the batter in the tray, after which the plate is returned to its first position, uprights on the casing at the rear thereof, a shaft journaled in the uprights, an arm connected with the last-mentioned shaft for limited play, an electrically heated plate carried by the said arm, spring means for holding the shaft with the last-mentioned plate in raised position, a crank on the last-mentioned shaft, a bar connected with the crank and extending into the casing, a roller on the inner end of the bar, a cam on the driven shaft for engaging the roller for moving the last-mentioned plate downwardly upon the first plate after the first plate has been moved to its starting position, the last mentioned cam holding the parts with the top plate in lowered position for a certain period of time after which the cam passes off the roller to permit the spring to return the top plate to raised position, a motor for rotating the driven shaft, a circuit for the motor, a thermal device in the circuit, switch means in the circuit which in one position connects the thermal device in the circuit and in the other position cuts out the thermal device from the circuit and connects the motor in the circuit, and a switch arm on the driven shaft for moving the switch to its first position after the shaft has made a complete revolution and the top plate is in raised position.

12. A cake making machine comprising a base forming casing, a shaft rotatably supported by the casing at the front thereof, an arm connected with the shaft, an electrically heated plate carried by the arm, a batter tray supported at the front of the casing, a gear on the shaft, a driven shaft journaled in the casing, a rack bar having its teeth engaging the gear, rollers on the bar, cams on the driven shaft for reciprocating the rack bar to rock the plate carrying shaft to move the plate first from a position on top of the casing to a position where its baking surface will enter the batter in the tray, after which the plate is returned to its first position, uprights on the casing at the rear thereof, a shaft journaled in the uprights, an arm connected with the last-mentioned shaft for limited play, an electrically heated plate carried by the said arm, spring means for holding the shaft with the last-mentioned plate in raised position, a crank on the last-mentioned shaft, a bar connected with the crank and extending into the casing, a roller on the inner end of the bar, a cam on the driven shaft for engaging the roller for moving the last-mentioned plate downwardly upon the first plate after the first plate has been moved to its starting position, the last mentioned cam holding the parts with the top plate in lowered position for a certain period of time after which the cam passes off the roller to permit the spring to return the top plate to raised position, a motor for rotating the driven shaft, a circuit for the motor, a thermal device in the circuit, switch means in the circuit which in one position connects the thermal device in the circuit and in the other position cuts out the thermal device from the circuit and connects the motor in the circuit, and a switch arm on the driven shaft for moving the switch to its first position after the shaft has made a complete revolution and the top plate is in raised position, means actuated by the motor for slowly raising the tray during the operation of the device, said means including a cam and a projection on the tray engaged by the cam.

ALFRED LAGRANGE.